July 21, 1942.  W. W. MORRAL  2,290,700
CORN HUSKING MACHINE
Filed Jan. 11, 1940  2 Sheets-Sheet 2
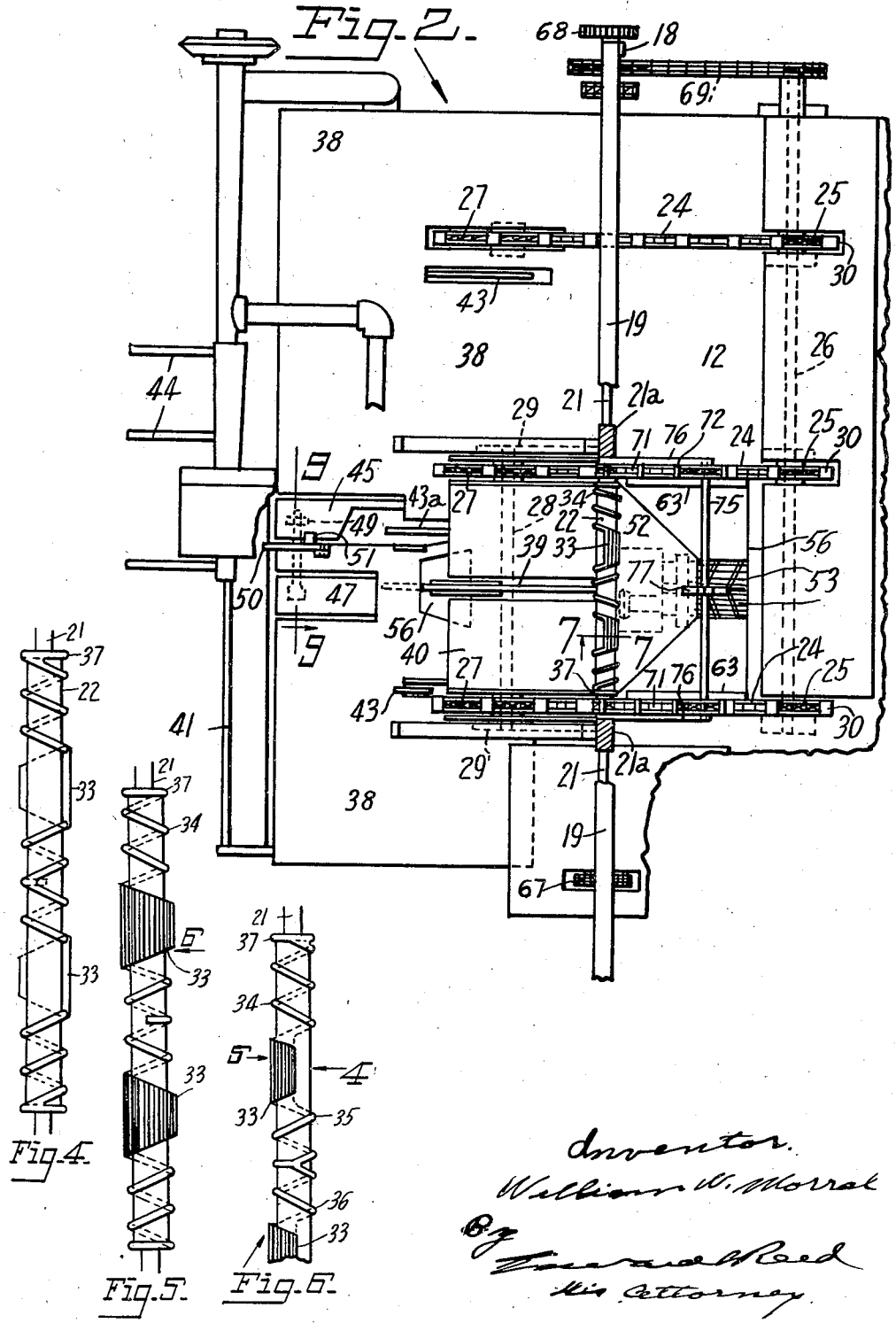

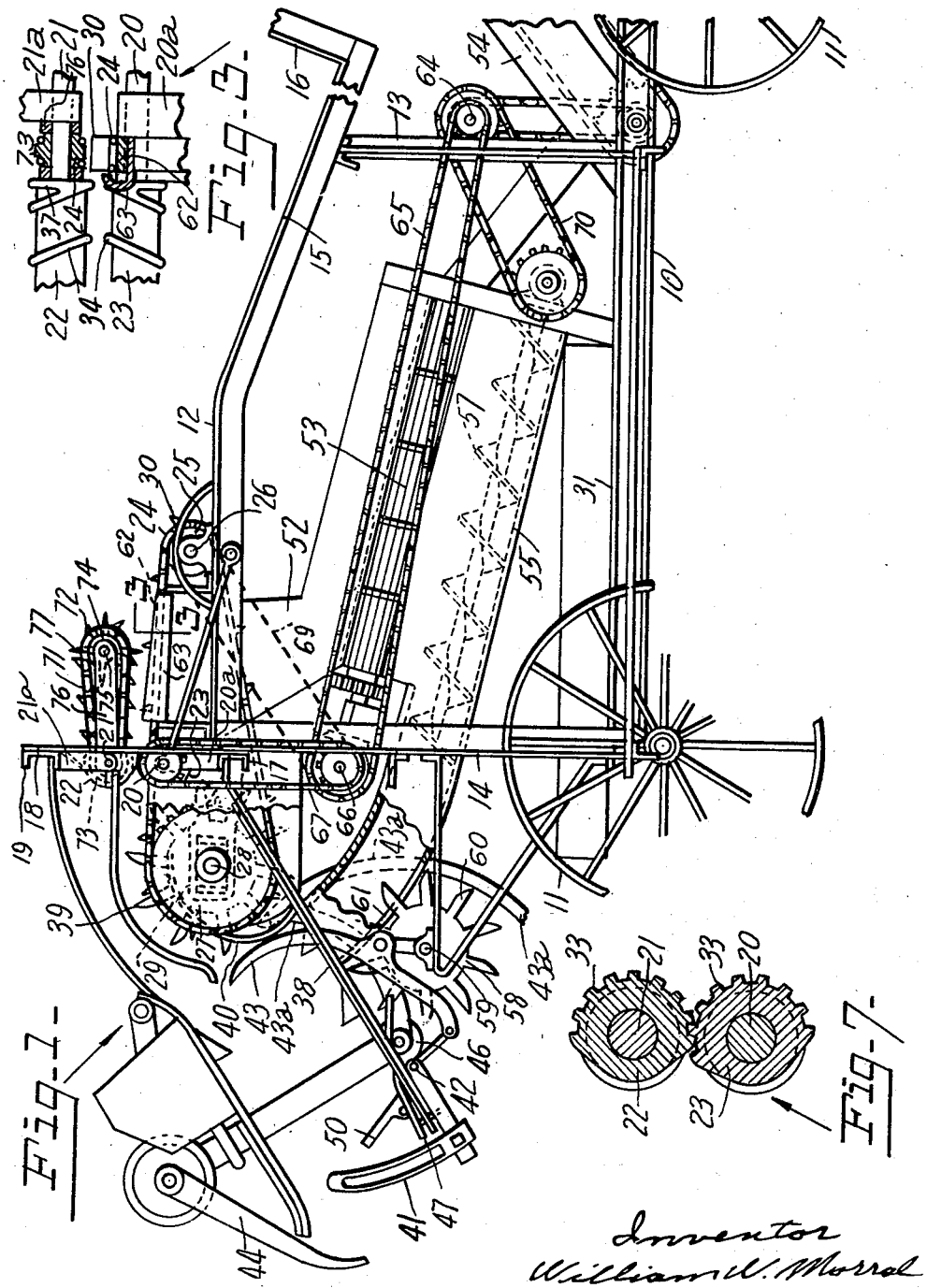

Patented July 21, 1942

2,290,700

UNITED STATES PATENT OFFICE 2,290,700

CORN HUSKING MACHINE

William W. Morral, Morral, Ohio, assignor of one-half to Samuel E. Morral, Morral, Ohio Application January 11, 1940, Serial No. 313,421

10 Claims. (Cl. 130—5)

This invention relates to a corn husking machine and more particularly to a machine for husking ripe corn from the shock, or bundle, as shown and described in Patent No. 1,556,016, granted October 6, 1925, to S. E. and W. W. Morral.

The main object of the present invention is to provide a husking machine of this character with means for expediting the operation thereof and overcoming various difficulties heretofore experienced in the operation of machines of this type.

To this end it is a further object of the invention to provide such a machine with means for bundling and tieing the stalks from which the ears have been removed and for so controlling the operation of the tieing mechanism that the latter will operate when the desired number of stalks have accumulated regardless of the disarrangement or distortion of the stalks.

A further object of the invention is to provide such a machine with means for positively delivering the husks which have been removed from the ears to the binding mechanism.

A further object of the invention is to provide such a machine with means for severing the ears from the stalks without causing material deformation of the stalks.

A further object of the invention is to provide such a machine with ear removing devices of such a character that the ears may be brought into severing position with a minimum of longitudinal movement of the stalks, and with which two ears on the same stalk may be removed substantially simultaneously.

A further object of the invention is to provide such a machine with means for guiding and protecting the conveyor chains which deliver the stalks to the ear removing devices.

Other objects of the invention may appear as the apparatus is described in detail.

In the accompanying drawing Fig. 1 is a side elevation, partly broken away, of a machine embodying my invention; Fig. 2 is a plan view of a portion of that machine, partly broken away; Fig. 3 is a detail view partly in section of portions of the snapping rollers and their bearings; Figs. 4, 5 and 6 are detail views of one of the snapping rollers, showing the same in different rotative positions; and Fig. 7 is a section taken through the two snapping rollers on the line 7—7 of Fig. 2.

In these drawings there is illustrated one embodiment of the invention and it is shown as comprising a main frame 10 preferably mounted on wheels 11 to enable it to be moved from shock to shock in the field. A feed table 12 is supported above the main frame 10 by two pairs of standards 13 and 14 arranged respectively near the rear and front ends of the main frame. This table has an inclined rear portion, as shown at 15, provided with an upwardly extending end member 16 so that in effect it forms a trough in which a quantity of corn stalks may be placed preliminary to delivering the same to the ear removing devices.

The front standards 14 are connected one to the other at their upper ends by a transverse bar 17 which extends laterally beyond both standards. Secured to this transverse bar near the respective ends thereof are other upright members or supplemental standards, one of which is shown at 18 and which are connected one to the other at their upper ends by a transverse bar 19. Journaled in suitable bearings on the supplemental standards 18 are shafts 20 and 21 which are spaced vertically one from the other and which carry the ear removing devices, here shown as snapping rollers 22 and 23. The intermediate portions of the shaft 20 and 21, adjacent the ends of the snapping rollers, are supported in bearings 20a and 21a carried respectively by the transverse bars 17 and 19. The space between the shafts and between the snapping rollers is unobstructed for substantially the full length of the shafts so as to permit the passage of a stalk of corn of normal length. Stalks of corn are moved between the snapping rollers by means of a conveyor, which is here shown as comprising conveyor chains 24 which are supported at their front ends on sprocket wheels 25 secured to a shaft 26 mounted on the feed table 12, and are supported at their rear ends on sprocket wheels 27 secured to a shaft 28 journaled in bearing brackets 29 carried by the standards 14. These conveyor chains are provided with lugs 30 to engage the individual stalks and the upper stretch of each chain extends between the shafts 20 and 21 adjacent the ends of the snapping rollers 22 and 23. If desired, an additional chain, or chains, 24 may be provided to advance the end portions of the stalks, beyond the snapping rollers, as shown in Fig. 2. The stalks may be delivered to the conveyor chains in any suitable manner but usually they are removed from the trough portion of the feeding table and placed on the conveyor by an operator standing on a platform 31 at the side of the machine. To hold the stalks in contact with the conveyor 24 suitable guides are arranged above the respective conveyor chains and these guides are here shown as a supplemental feeding device comprising chains 71 provided with lugs 72. The lower stretches of the chains 71 are spaced from the conveyor chains 24 a distance slightly greater than the thickness of a corn stalk and move in the same direction as the upper stretches of the chains 24. Thus the conveyor chains 71 not only hold the stalks in the path of the lugs on the conveyor chains 24 but assist in moving the stalks to the snapping rollers. The chains 71 preferably extend about sprocket wheels 73 mounted on the shaft 21 and about sprocket wheels 74 mounted on a shaft 75 journaled in the front ends of brackets 76 secured to the bearings 21a. A star wheel 77 is secured to the shaft 75 and arranged to engage the intermediate portions of the stalks and prevent the same from lagging due to the weight of the ears.

The ear removing devices or snapping rollers may take various forms and as heretofore used each snapping roller was provided with a single ear severing part, arranged near the center thereof, and with spiral ribs to move the ear and stalk lengthwise of the rollers to bring the ear into such a position that the butt or stem thereof would be engaged between the ear severing parts of the two rollers. The ears on different stalks are spaced different distances from the lower or butt ends of the stalks and when a single pair of ear removing parts is employed it frequently happens that the ear and stalk must be moved longitudinally for a relatively long distance before the ear is brought into engagement with the ear severing parts and this retards the forward movement of that portion of the stalk to which the ear is connected, the end portions of the stalk being moved forward continuously by the conveyor chains. Further, if there were two ears on the same stalk these would have to be removed successively, thus further retarding the movement of the intermediate portion of the stalk. In the present instance, each snapping roller is provided with a plurality, preferably two, ear severing portions 33 which are spaced apart lengthwise of the rollers, the ear severing parts of each roller being arranged to cooperate with the corresponding ear severing parts of the other roller. These ear severing parts or snapping sections of the rollers may take various forms and they are here shown as comprising a series of ribs extending lengthwise of the roller, the series of ribs extending approximately half way around the roller. The cooperating ear severing parts of the two snapping rollers may be arranged in any suitable relation one to the other but I prefer that they be so arranged that the ribs on the respective rollers may mesh one with the other, as shown in Fig. 7. The meshing of the ribs causes the rollers to more quickly and effectively sever the stems of the ears and this in turn prevents the butt ends of the ears from being drawn into contact with the ear severing parts, which would result in more or less corn being shelled from the ear. The intermediate portion of the upper roller shaft 21 and the supporting structure therefor will yield sufficiently to permit a slight upward movement of the upper snapping roller as the stem of the ear passes between the ear severing parts. The shafts 20 and 21 are connected one with the other at their ends by gears, as will be hereinafter described, and these gears prevent relative displacement of the ear severing parts of the snapping rollers. The ear severing parts may be spaced one from the other and from the ends of the rollers as desired, but preferably the two ear severing parts of each roller are spaced one from the other approximately the same distance that they are spaced from the respective ends of the roller. Each roller is provided with spiral ribs arranged to move the ears into engagement with the ear severing parts of the roller. In the arrangement here shown each roller is provided on each end portion thereof, that is, on the outer sides of the ear severing parts, with spiral ribs 34 turned in a direction to move the ears inwardly toward the respective ear severing parts. That portion of the roller between the two ear severing parts is also provided with a spiral rib and this rib is here shown as divided into two parts 35 and 36, the parts being turned in opposite directions so that the part 35 of the rib will move an ear toward one ear severing part and the part 36 will move an ear toward the other ear severing part. Thus if the ear initially engages the roller between the two ear severing parts it will be moved toward that part which is nearest thereto. Furthermore, if the stalk carries two ears these ears may be moved simultaneously into engagement with the two ear severing parts of the roller or, if the ears are spaced substantially different distances from the respective ear severing parts, the movement of the stalk and ears will continue until the second ear has been brought into engagement with one of the ear severing parts. In the present instance, the spiral ribs 34 on the outer end portions of each roller terminate in circumferential flanges 37 at the respective ends of the roller, these flanges serving to limit the outward movement of the ears and prevent the same from slipping past the ends of the rollers, thus insuring the removal of all ears.

After the ears have been removed the stalks are carried beyond the snapping rollers by the conveyor 24 toward a binding table 38 and as they approach the forward end of the conveyor they are engaged by a star wheel 39 which tends to advance the intermediate portions of the stalks with relation to the end portions thereof and deliver the same to the binding table in a substantially straight condition, a guard plate 40 being provided to disengage the stalks from the fingers of the star wheel. The binding table 38 slopes downwardly and forwardly and is provided at its lower end with an upwardly extending part or gate 41 which serves to retain the stalks on the stable until a sufficient quantity has accumulated to form a bundle but this gate is pivotally mounted at 42 so that it may be swung downwardly to permit the discharge of the bundle. Associated with the binding table is binding mechanism of a type which is well known and need not be here described in detail. Suffice it to say that it comprises gathering arms 43 which serve to gather the stalks into a compact bundle on the table 38, mechanism including a needle 43a for tieing the bundle and an ejecting device 44 for discharging the tied bundle from the table.

The operation of the tieing and ejecting mechanism is automatically initiated by the accumulation on the table of a quantity of stalks sufficient to form a bundle of the desired size. In the present instance a trip lever 47 is mounted on the binding table and so connected with the clutch 46 that the weight and pressure of the stalks accumulating thereon will actuate a clutch 46 to initiate the tieing operation. The details of the tripping mechanism form no part of the present invention.

The ears which are removed from the stalks are delivered through a chute 52 to husking rollers 53 which are arranged below and in advance of the snapping rollers, and these rollers remove the husks from the ears and deliver the husked ears to a suitable point of discharge. In the present instance the ears are delivered to an upwardly and rearwardly inclined conveyor 54 which may discharge the same into the bed of a wagon or the like. The husks are discharged from the husking rollers into a chute 55 which extends rearwardly and upwardly and is connected with an opening 56 in the binding table 38 through which the husks are discharged onto the binding table so that they will be bound into bundles along with the stalks. A spiral conveyor 57 is mounted in the forward portion of the chute 55 to move the husks toward the binding table but the rear portion of the chute is preferably tubular and curved upwardly, so that the conveyor terminates a substantial distance from the discharge end of the chute, and as a result the husks are likely to be packed in the rear portion of the chute in a manner to clog the same. To avoid this and to cause the husks to be positively delivered onto the binding table I have provided an ejecting device which is here shown as a star wheel 58 mounted on the shaft 59, which actuates the gathering arms, and having a circumferential series of teeth or fingers 60 which are moved successively through a slot 61 in the curved portion of the chute 55. As the wheel 58 rotates the teeth move through the curved portion of the chute with a continuous rearward movement and thus engage the husks in the chute and positively move the same through the openings 56 and onto the binding table.

To prevent the conveyor chains 24 from sagging it is preferable to provide beneath the upper stretch of each chain a guide member 62 which extends substantially parallel therewith and supports the chain in a horizontal position. Secured to this guide member is a guard 63 (Fig. 3) which extends upwardly across the inner side of the chain to a point above the same and this upwardly extending part of the guard is arranged substantially in line with the flange 37 of the lower snapping roller, and cooperates therewith to prevent the ears moving beyond the ends of the snapping rollers.

The several parts of the mechanism may be driven in any suitable manner from any suitable source of power and, as here shown, a main drive shaft 64 is mounted near the rear end of the machine and is connected by a sprocket chain 65 with a shaft 66 journaled in bearings on the uprights 14 and this shaft is connected by a sprocket chain 67 with the shaft 20 of the lower snapping roller and the two shafts 20 and 21 are connected at their ends by gears, one of which is shown at 68, to cause them to rotate in unison in opposite directions. The conveyor shaft 26 is driven by a sprocket chain 69 from the shaft 66. The binding mechanism is driven from the shaft 66 by suitable driving connections not here shown. The husking rollers are driven directly from the shaft 64 by a sprocket chain 70.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent is:

1. In a corn husking machine, a pair of transverse shafts spaced vertically one from the other to permit the passage of a cornstalk between the same, ear removing rollers carried by the respective shafts, means to move stalks of corn transversely to their length between said shafts and said rollers, each ear removing roller having a plurality of separate longitudinally spaced ear severing parts cooperating with the corresponding parts of the other roller to sever the ears from the stalks, and means carried by said rollers for moving said stalks lengthwise of said rollers to bring the stems of the ears thereon into engagement with the ear severing part nearest thereto.

2. An ear removing device for a corn husking machine of the type in which the stalks of corn are moved transversely to their length between the snapping rolls comprising, a pair of snapping rollers each having a plurality of separate ear severing parts spaced longitudinally one from the other and cooperating with the corresponding parts on the other roller, each roller also having spiral ribs arranged between the adjacent ends of said ear severing parts and at the outer ends of said ear severing parts to move the ears toward the respective ear severing parts.

3. An ear removing device for a corn husking machine of the type in which the stalks of corn are moved transversely to their length between the snapping rolls comprising, a pair of snapping rollers each having a pair of separate ear severing parts spaced longitudinally one from the other and cooperating with the corresponding parts on the other roller, each roller also having spiral ribs arranged at the outer ends of said ear severing parts to move the ears inwardly inwardly toward the respective ear severing parts, and a spiral rib between the adjacent ends of said ear severing parts having portions turned in opposite directions to move ears which are located between said ear severing parts toward the nearest ear severing part.

4. An ear removing device for a corn husking machine of the type in which the stalks of corn are moved transversely to their length between the snapping rolls comprising, a pair of snapping rollers each having a plurality of separate ear severing parts spaced longitudinally one from the other and provided with rough surfaces to cooperate with the corresponding parts on the other roller, each roller also having spiral ribs arranged between the adjacent ends of said ear severing parts and at the outer ends of said ear severing parts to move the ears toward the respective ear severing parts.

5. An ear removing device for a corn husking machine of the type in which the stalks of corn are moved transversely to their length between the snapping rolls comprising, a pair of snapping rollers each having a plurality of separate ear severing parts spaced longitudinally one from the other and each comprising a series of circumferentially spaced longitudinal ribs arranged to mesh with the ribs of the corresponding ear severing part on the other roller as said rollers rotate in opposite directions, each roller also having spiral ribs arranged between the adjacent ends of said ear severing parts and at the outer ends of said ear severing parts to move the ears toward the respective ear severing parts.

6. An ear removing device for a corn husking machine of the type in which the stalks of corn are moved transversely to their length between the snapping rolls comprising, a pair of snapping rollers having cooperating ear removing parts, each roller having on its outer end portions spiral ribs to move the ears and stalks lengthwise to bring the ears into engagement with said ear removing parts, and also having at the outer end of each spiral rib a circumferential flange of a radial width substantially equal to the radial width of said ribs to limit the outward movement of said ears, and means for moving the stalks of corn to and beyond said snapping rollers.

7. An ear removing device for a corn husking machine of the type in which the stalks of corn are moved transversely to their length between the snapping rolls comprising, a pair of snapping rollers each having a plurality of ear severing parts spaced longitudinally one from the other and cooperating with the corresponding parts on the other roller, each roller also having spiral ribs arranged between the adjacent ends of said ear severing parts and at the outer ends of said ear severing parts to move the ears toward the respective ear severing parts, each roller also having adjacent the outer end of each outer spiral rib a circumferential flange of a radial width substantially equal to the radial width of said ribs to limit the outward movement of said ears, and means for moving the stalks of corn to and beyond said snapping rollers.

8. In a corn husking machine, a pair of ear removing rollers arranged one above the other and having cooperating ear severing parts and means for moving ears of corn lengthwise thereof toward said ear severing parts, each roller having circumferential flanges at the ends thereof to limit the outward movement of said ears, conveyor chains extending transversely to and between the axes of said ear removing rollers adjacent the ends thereof to move stalks of corn between the same, and guards extending along the inner sides of said chains and substantially in line with the respective flanges of one of said ear removing rollers.

9. In a corn husking machine, a pair of transverse shafts extending for substantially the full width of said machine and spaced vertically one from the other to permit the passage of a stalk of corn between the same, ear removing rollers carried by the respective shafts and each having a plurality of longitudinally spaced ear severing parts cooperating with the corresponding parts of the other roller to sever the ears from the stalks, and each roller having spiral ribs at both ends of said ear severing part, said ribs being turned in directions to move the ears toward the ear severing part nearest thereto, conveyors extending between said shafts near the respective ends of said rollers to move the ear bearing portions of said stalks between said rollers, a third conveyor extending between said shafts at a point spaced from the first mentioned conveyors to move the end portions of said stalks between said shafts substantially in line with the butt ends thereof, and a supplemental feeding device mounted beyond said rollers and having means to engage the ear bearing portions of said stalks and advance the same with relation to the end portions thereof.

10. In a corn husking machine, a pair of transverse shafts extending for substantially the full width of said machine and spaced vertically one from the other to permit the passage of a cornstalk between the same, ear removing rollers carried by the respective shafts and having ear severing parts cooperating to sever the ears from the stalks and spiral ribs to move the ears toward said ear severing parts, conveyor chains extending between said shafts near the respective ends of said rollers to move the ear bearing portions of said stalks between said rollers, a third conveyor chain extending between said rollers at a point spaced from the first mentioned chains to move the end portions of the stalks between said shafts substantially in line with the butt end portions thereof, and a toothed wheel rotatably mounted beyond said rollers and arranged to engage the ear bearing portions of said stalks and advance the same with relation to the end portions thereof.

WILLIAM W. MORRAL.